United States Patent [19]

Engler et al.

[11] Patent Number: 5,421,163
[45] Date of Patent: Jun. 6, 1995

[54] PROCESS FOR THE COMBINED PRODUCTION OF NITROGEN AND OXYGEN WITH ADJUSTABLE FLOWS

[75] Inventors: Yves Engler, Vincennes; Wilfrid Petrie; Christian Monereau, both of Paris, all of France

[73] Assignee: L'Air Liquide, Societe Anonyme pour l'Etude et l'Exploitation des Procedes Georges Claude, Paris Cedex, France

[21] Appl. No.: 74,825

[22] PCT Filed: Nov. 13, 1992

[86] PCT No.: PCT/FR92/01058

§ 371 Date: Jun. 11, 1993

§ 102(e) Date: Jun. 11, 1993

[87] PCT Pub. No.: WO93/11395

PCT Pub. Date: Jun. 10, 1993

[30] Foreign Application Priority Data

Nov. 26, 1991 [FR] France .................. 91 14546

[51] Int. Cl.[6] .................................. F25J 3/00
[52] U.S. Cl. ........................... 62/18; 62/21; 62/37
[58] Field of Search ............... 62/18, 19, 21, 37

[56] References Cited

U.S. PATENT DOCUMENTS

| | | | |
|---|---|---|---|
| 3,267,645 | 8/1966 | Simonet | 62/18 |
| 3,421,984 | 1/1969 | Jensen et al. | 62/18 |
| 3,912,476 | 10/1975 | Mikawa et al. | 62/37 |
| 4,367,082 | 1/1983 | Tomisaka et al. | 62/18 |
| 4,459,143 | 7/1984 | Nawata et al. | 62/18 |

FOREIGN PATENT DOCUMENTS

| | | |
|---|---|---|
| 0456575 | 11/1991 | European Pat. Off. |
| 2280043 | 2/1976 | France |
| 2021748 | 12/1979 | United Kingdom |
| 2190477 | 11/1987 | United Kingdom |

*Primary Examiner*—Ronald C. Capossela
*Attorney, Agent, or Firm*—William S. Frommer

[57] ABSTRACT

A flow of air which has been compressed cooled dried is treated in a unit for separation by cryogenic distillation to give a flow of nitrogen; the oxygen enriched residual gases are, in part, sent at the inlet of a unit for separation by adsorption in which the outlet substantially produces oxygen. If the flow of oxygen is insufficient, additional air is injected. If the flow of oxygen is too important, an excess flow of residual gases is withdrawn. This apparatus enables to provide, at a lesser cost, independent flows of nitrogen and oxygen which are adjustable at will.

17 Claims, 1 Drawing Sheet

U.S. Patent
June 6, 1995
5,421,163
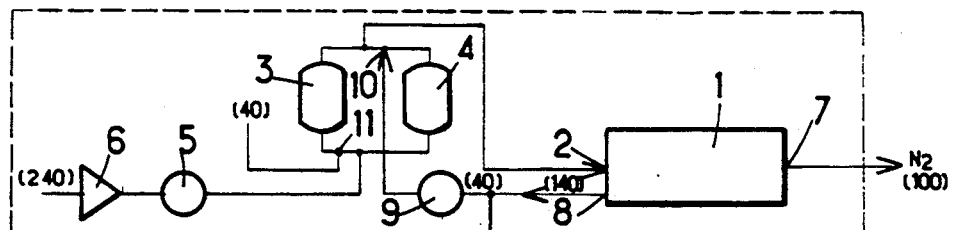
FIG.:1
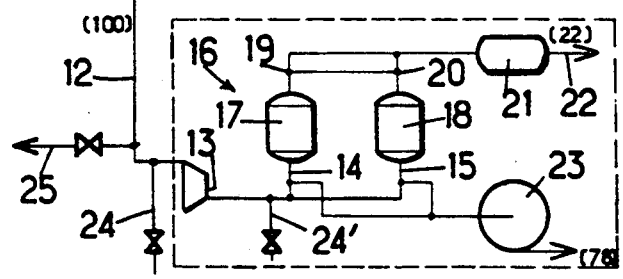
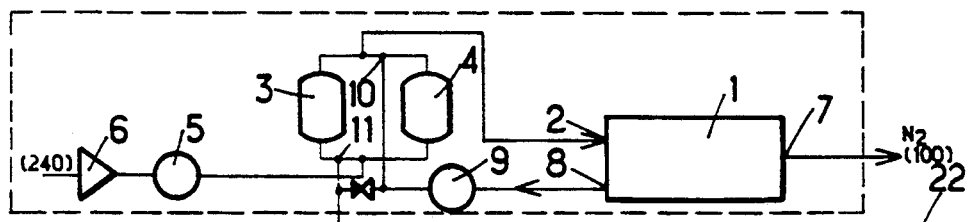
FIG.:2
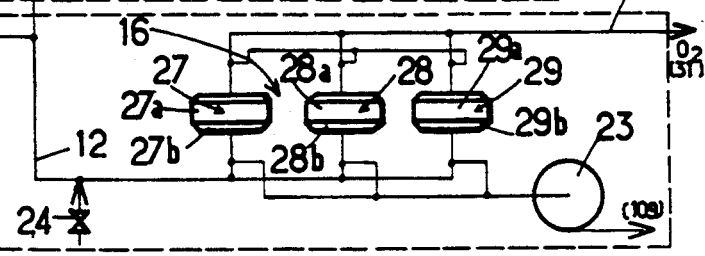
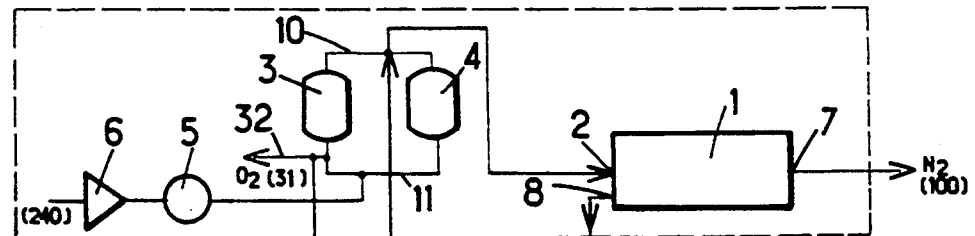
FIG.:3
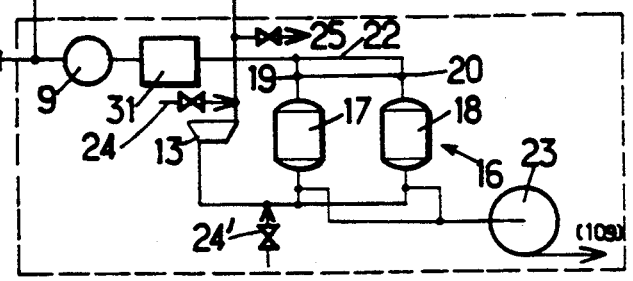

PROCESS FOR THE COMBINED PRODUCTION OF NITROGEN AND OXYGEN WITH ADJUSTABLE FLOWS

BACKGROUND OF INVENTION (a) Field of the Invention

The present invention concerns the combined production of nitrogen and oxygen with adjustable flows, of the type utilizing an initial separation of air to produce a substantially pure flow of nitrogen and a flow of oxygen enriched residual gases, with subsequent purification treatment.

(b) Description of Prior Art

This production which is generally carried out by cryogenic distillation necessarily leads to the production of nitrogen and oxygen flows which are within well determined relative proportions, the flow of nitrogen being of the order of 2, 5 times the flow of oxygen except, of course, that two separation units which are independent from one another must be provided, which is very costly.

SUMMARY OF INVENTION

The aim of the present invention is to ensure the combined production of nitrogen and oxygen with adjustable flows starting from an initial separation of air, with addition of supplementary separation means representing moderate investment and maintenance costs, and this object of the invention is achieved by treating said residual gases, to which a complementary flow of air is possibly added, by adsorption to give an adjustable flow of substantially pure oxygen. It will be understood that this arrangement, which treats residual gases that have already been enriched in oxygen is less costly than a supplementary treatment of atmospheric air, while presenting an important flexibility of control of the respective flows of nitrogen and oxygen.

According to an embodiment, the treatment by adsorption is carried out at the pressure of the residual gases which are derived from the initial separation of air, while the regeneration of the adsorber is carried out at a truly inferior pressure, possibly under vacuum if the pressure of the residual gases from the initial separation is not much higher than atmospheric pressure. According to a variant, the residual gases from the initial separation of air are compressed again before treating them by adsorption.

Generally, the initial separation of air is a cryogenic distillation which is preceded by a drying-decarbonizing step, and in such a case:

- either a portion only of the residual gases is treated by adsorption, the remainder being used as regeneration gas carrier in the drying-decarbonizing of the air to be treated by cryogenic distillation;
- or at least a portion of the residual gases which are derived from the cryogenic distillation is used to regenerate the drying-decarbonizing before being treated by adsorption and, advantageously by drying-decarbonizing;
- or at least a portion of the residual gases which are derived from the cryogenic distillation is directly treated by adsorption, the oxygen produced by adsorption being used as regeneration gas carrier for drying-decarbonizing the air intended to be treated by cryogenic distillation.

The invention also concerns an apparatus for carrying out the above process.

BRIEF DESCRIPTION OF DRAWINGS

The invention will now be illustrated with reference to the annexed drawings in which:

FIGS. 1 to 3 are three variant embodiments of a production apparatus according to the invention.

DESCRIPTION OF PREFERRED EMBODIMENTS

With reference to FIG. 1, an apparatus comprises a unit for production by cryogenic distillation 1 including an inlet for air to be separated 2 which is connected via a double dryer-decarbonizer, 3, 4 to a cooler 5 downstream of an atmospheric air compressor 6. In usual manner, when a dryer-decarbonizer 3, (4) is in operation, the other 4, (3) is being regenerated by means of a hot carrier gas.

The distillation unit 1 includes an outlet for pure nitrogen produced 7 and an outlet for residual gases 8, having an oxygen content, between 30 and 60%, for example of the order of 42%. The outlet for residual gases 8 is connected on the one hand via a heater 9 to an "outlet" 10 of a dryer-decarbonizer 3 or 4 in the process of being regenerated, in which an "inlet" 11 constitutes the outlet of the regeneration gas carrier loaded with water and carbon dioxide, on the other hand via a duct 12 including possibly a compressor 13 to either inlet 14, 15 of a unit for separation by adsorption 16 including two adsorpers 17, 18 with molecular sieves which preferably adsorb nitrogen, of which either outlet 19, 20 opens in a buffer-container 21, on which is connected a duct for the production of oxygen 22. Usually, one of the adsorbers 17, (18) is in operation, while the other 18, (17) is being regenerated by depressurization, possibly, by means of a vacuum pump 23 alternatively connected on either of the "inlet" 14, 15. Of course, this adsorption unit is schematically illustrated with two adsorbers only and without the set of change over cycle valves, and it should be understood that, generally, a larger number of adsorbers are used, in which one or more than one are either in production, or being depressurized, or being repressurized.

Additional air may be added to the adsorption unit either at 24 upstream of the compressor 13, if any, or at 24' downstream of the same compressor 13. On the other hand, an excess of residual gases may be withdrawn at 25.

The apparatus operates in the following manner:

A flow of air (240 $Nm^3$) is first compressed (6–7 bars) at 6, then cooled at 5, dried-decarbonized at 3 or 4 before being introduced at 2 5 in the distillation unit 1. A flow (100 $Nm^3$) of substantially pure nitrogen exits at 7, and a flow of residual gases exits at 8, of which the oxygen molar content is of the order of 40 to 60%, which is divided into a flow (140 $Nm^3$) of regeneration carrier gas for the dryer-decarbonized 3, (4) which is first directed towards the heater 9, and a flow of residual gases to be treated (100 $Nm^3$) which is transferred via duct 12, and compressor 13, if any, to an inlet 14, 15 of the unit for treatment for adsorption 16, producing a flow of substantially pure oxygen (22 $Nm^3$) at 22 and a flow of residual gases (78 $Nm^3$) which is rejected to the atmosphere, possibly via vacuum pump 23.

Assuming that the flow of nitrogen (100 $Nm^3$) which exits at 7 is the desired flow, it is possible that the flow of oxygen which exits at 22 (22 $Nm^3$) is also sufficient.

In this case, no additional flow of air is injected at 24, 24'.

On the contrary, if the flow of oxygen at 22 is insufficient or is too important, a supplementary flow of air is injected at 24, 24', or an excess flow of residual gases is respectively withdrawn at 25, such that the flow of oxygen which exits at 22 is the one desired, which modifies in no way the operation of the unit for separation by distillation 1.

With reference to FIG. 2, the latter shows the same means generally designated by the same reference numbers, except that the totality or a substantial portion of the residual gases which exit at 8 (140 $Nm^3$) from the distillation apparatus is sent via the heater 9 to exit 10 of the dryer-decarbonizer being regenerated 3, (4) of which the inlet 11 delivers this total flow via duct 12 to the adsorption unit consisting here of three adsorbers 27, 28, 29 incorporating a molecular sieve (27a, 28a, 29a) associated, upstream, with a bed of alumina (27b, 28b, 29b) to stop water and carbon dioxide which is present in the dryer-decarbonizer 3, 4.

With reference to FIG. 3, where the same elements are designated by the same reference numbers as on FIG. 1, the regeneration of the dryer-decarbonizer 3, 4 is here ensured by at least a portion of the flow of oxygen produced at 22, which is possibly recompressed at 31 and heated at 9, and is sent to an outlet 10 of the dryer-decarbonizer being regenerated 3, (4), whose inlet is then connected to a duct for the production of slightly humidified oxygen 32. It will be noted that the numbers in brackets represent the flows treated from a flow of 240 $Nm^3$ air. As previously, if the flow of oxygen at 32 (31 $Nm^3$) appears to be insufficient, a flow of additional air is injected at 24 or 24', to be treated by the unit for separation by adsorption. If one of the residual gases is too important, it is withdrawn at 25.

We claim:

1. A process for the production of nitrogen and oxygen in adjustable quantities from an input flow of air, comprising the steps of:
    separating the air by cryogenic distillation to provide a flow of substantially pure nitrogen and a residual gas flow of oxygen enriched residual gases;
    modifying said residual gas flow by selectively adding an additional amount of air to the flow of oxygen enriched residual gases or withdrawing an excess amount of said oxygen enriched residual gases, and
    treating the modified residual gas flow by adsorption to provide a flow of substantially pure oxygen.

2. The process of claim 1 wherein adsorption of the modified residual gas flow is carried out by an adsorber operative at a pressure substantially equal to the pressure of the separated residual gas flow; and further comprising the step of regenerating said adsorber at a substantially lower pressure.

3. The process of claim 2 wherein the regeneration pressure is approximately a vacuum pressure when the pressure of the separated residual gas flow is slightly higher than atmospheric pressure.

4. The process of claim 1 further comprising the step of compressing said residual gas flow prior to said treatment by adsorption.

5. The process of claim 1 further comprising the step of drying-decarbonizing said input flow of air in a dryer-decarbonizer prior to separation by cryogenic distillation.

6. The process of claim 5 further comprising the step of supplying a portion of said residual gas flow to said dryer-decarbonizer as a regeneration carrier gas; and modifying the remainder of said residual gas flow.

7. The process of claim 5 further comprising the step of supplying said residual gas flow to said dryer-decarbonizer as a regeneration carrier gas prior to modification.

8. The process of claim 5 further comprising the step of supplying said flow of substantially pure oxygen to said dryer-decarbonizer as a regeneration carrier gas.

9. Apparatus for the production of nitrogen and oxygen in adjustable quantities from an input flow of air, comprising:
    a cryogenic distillation unit for separating the air to provide a flow of substantially pure nitrogen and a residual gas flow of oxygen enriched residual gases;
    means for modifying said residual gas flow by selectively adding an additional amount of air to the flow of oxygen enriched residual gases or withdrawing an excess amount of said oxygen enriched residual gases, and
    an adsorber for treating the modified residual gas flow by adsorption to provide a flow of substantially pure oxygen.

10. The apparatus of claim 9 wherein said adsorber is operative at a pressure substantially equal to the pressure of the separated residual gas flow, and said adsorber is regenerated at a substantially lower pressure.

11. The apparatus of claim 10 wherein the adsorber is regenerated at approximately a vacuum pressure when the pressure of the separated residual gas flow is slightly higher than atmospheric pressure.

12. The apparatus of claim 9 further comprising a compressor for compressing said residual gas flow prior to said treatment by said adsorber.

13. The apparatus of claim 9 further comprising a dryer-decarbonizer for drying-decarbonizing said input flow of air prior to separation by said cryogenic distillation unit.

14. The apparatus of claim 13 wherein the cryogenic distillation unit has an output coupled to said dryer-decarbonizer for supplying a portion of said residual gas flow as a regeneration carrier gas, said output being additionally coupled to said adsorber via said means for modifying.

15. The apparatus of claim 13 wherein the cryogenic distillation unit has an output coupled to said dryer-decarbonizer for supplying said residual gas flow as a regeneration carrier gas and thence to said adsorber via said means for modifying.

16. The apparatus of claim 13 wherein the adsorber has an output coupled to said dryer-decarbonizer for supplying said flow of substantially pure oxygen as a regeneration carrier gas.

17. The apparatus of claim 16 further comprising a compressor and a heater for coupling the output of said adsorber to said dryer-decarbonizer.

* * * * *